(12) United States Patent
Sprenger

(10) Patent No.: US 10,933,772 B2
(45) Date of Patent: Mar. 2, 2021

(54) LONGITUDINAL ADJUSTER FOR A VEHICLE SEAT, AND VEHICLE SEAT

(71) Applicant: Adient Luxembourg Holding S.à.r.l., Luxembourg (LU)

(72) Inventor: Erik Sprenger, Wermelskirchen (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 35 days.

(21) Appl. No.: 15/534,701

(22) PCT Filed: Nov. 27, 2015

(86) PCT No.: PCT/EP2015/077877
§ 371 (c)(1),
(2) Date: Jun. 9, 2017

(87) PCT Pub. No.: WO2016/091614
PCT Pub. Date: Jun. 16, 2016

(65) Prior Publication Data
US 2017/0334319 A1    Nov. 23, 2017

(30) Foreign Application Priority Data

Dec. 12, 2014 (DE) ...................... 10 2014 225 707.7

(51) Int. Cl.
*B60N 2/08* (2006.01)
*B60N 2/07* (2006.01)
(52) U.S. Cl.
CPC ......... *B60N 2/0875* (2013.01); *B60N 2/0705* (2013.01); *B60N 2/0715* (2013.01);
(Continued)

(58) Field of Classification Search
CPC .. B60N 2/0875; B60N 2/0705; B60N 2/0715; B60N 2/0806; B60N 2/0818;
(Continued)

(56) References Cited

U.S. PATENT DOCUMENTS 5,524,504 A    6/1996  Brandoli et al.
5,718,477 A    2/1998  Schueler
(Continued)

FOREIGN PATENT DOCUMENTS

CN    1 247 398 C    3/2006
CN    102 555 847 A    7/2012
(Continued)

*Primary Examiner* — Christopher Garft
(74) *Attorney, Agent, or Firm* — Marshall & Melhorn, LLC

(57) ABSTRACT

A longitudinal adjuster (3) for a vehicle seat (1) includes at least one rail pair (7), including a lower rail (9) and an upper rail (11), which can be moved longitudinally in relation to the lower rail (9). At least one locking unit (13) locks the upper rail (11). At least one actuating element (5) releases the locking of the upper rail (11). The locking unit (13) includes at least one locking element (15) and at least one spring element (17), which are operatively engaged with each other. The spring element (17) is interlockingly and frictionally connected to the upper rail (11) by an insertion locking connection (S). The spring element (17) applies a preloading force to the actuating element (5) and to the locking element (15). A vehicle seat (1) is also provided with at least one such longitudinal adjuster (3).

23 Claims, 4 Drawing Sheets

(52) U.S. Cl.
CPC ......... *B60N 2/0806* (2013.01); *B60N 2/0818* (2013.01); *B60N 2/0887* (2013.01)

(58) Field of Classification Search
CPC .... B60N 2/0812; B60N 2/085; B60N 2/0837; B60N 2/0862; B60N 2/08; B60N 2/0887
See application file for complete search history.

(56) References Cited

U.S. PATENT DOCUMENTS

| | | | | |
|---|---|---|---|---|
| 6,036,157 | A * | 3/2000 | Baroin | B60N 2/0705 |
| | | | | 248/429 |
| 8,939,424 | B2 | 1/2015 | Fukuda et al. | |
| 9,315,119 | B2 * | 4/2016 | Yamada | B60N 2/0818 |
| 2012/0145866 | A1 * | 6/2012 | Fukuda | B60N 2/0818 |
| | | | | 248/429 |
| 2012/0205512 | A1 * | 8/2012 | Fujishiro | B60N 2/433 |
| | | | | 248/429 |
| 2013/0341484 | A1 * | 12/2013 | Yamada | B60N 2/22 |
| | | | | 248/636 |
| 2014/0145054 | A1 * | 5/2014 | Yamada | B60N 2/07 |
| | | | | 248/429 |
| 2015/0291062 | A1 * | 10/2015 | Yamada | B60N 2/0705 |
| | | | | 384/47 |

FOREIGN PATENT DOCUMENTS

| | | |
|---|---|---|
| CN | 202 641 425 U | 1/2013 |
| CN | 203 739 683 U | 7/2014 |
| CN | 104 010 874 A | 8/2014 |
| EP | 0 752 338 B1 | 4/1998 |
| EP | 0 904 977 B1 | 5/2000 |
| EP | 2 497 683 B1 | 11/2013 |
| FR | 2 767 096 B1 | 10/1999 |
| JP | 2011-098610 A | 5/2011 |
| JP | 2012-140116 A | 7/2012 |
| WO | 2013/092089 A1 | 6/2013 |

* cited by examiner

LONGITUDINAL ADJUSTER FOR A VEHICLE SEAT, AND VEHICLE SEAT

CROSS REFERENCE TO RELATED APPLICATIONS

This application is a United States National Phase Application of International Application PCT/EP2015/077877, filed Nov. 27, 2015, and claims the benefit of priority under 35 U.S.C. § 119 of German Application 10 2014 225 707.7, filed Dec. 12, 2014, the entire contents of which are incorporated herein by reference.

FIELD OF THE INVENTION

The invention relates to a longitudinal adjuster for a vehicle seat. The invention furthermore relates to a vehicle seat comprising a longitudinal adjuster of this kind.

BACKGROUND OF THE INVENTION

EP 0 752 338 B1, FR 2 767 096 B1 and EP 0 904 977 B1 each describe a longitudinal adjuster which comprises at least one lower rail and at least one upper rail, which can be moved longitudinally in relation to the lower rail, as well as an elastic element arranged on the upper rail. The elastic element is provided for the purpose of locking the upper rail to the lower rail and, in particular, is arranged on the upper rail by means of a riveted joint.

SUMMARY OF THE INVENTION

It is an object of the present invention to specify a longitudinal adjuster for a vehicle seat which is better than the prior art and to specify an improved vehicle seat.

A longitudinal adjuster according to the invention for a vehicle seat comprises at least one rail pair, comprising a lower rail and an upper rail, which can be moved longitudinally relative to the lower rail, at least one locking unit for locking the upper rail, and at least one actuating element for releasing the locking of the upper rail. The locking unit comprises at least one locking element and at least one spring element, which are in operative engagement with one another, wherein the spring element is connected to the upper rail in a form- and force-fitting manner by means of a plug-in/latching connection, and wherein the spring element applies a preloading force to the actuating element and to the locking element.

The plug-in/latching connection of the spring element to the movable upper rail makes possible improved mechanical stability of the longitudinal adjuster in comparison with the prior art since deformation of the upper rail for connection to the spring element and possible distortion of the components resulting from this are avoided. As a result, there is furthermore the possibility of producing the upper rail from a high-strength material. Mechanical stability of the plug-in/latching connection is ensured by the preloading forces produced on the actuating element and the locking element.

According to one embodiment of the invention, the spring element has at least one latching nose and at least one latching tab, which can be arranged in corresponding apertures in the upper rail to form the plug-in/latching connection.

In this case, the latching nose can be inserted into a corresponding aperture, and the latching tab can be latched in a different corresponding aperture.

According to another embodiment of the invention, the aperture corresponding to the latching nose has two regions with widths that differ in the direction of a transverse axis, wherein the latching nose has two sections with widths that differ in the direction of a transverse axis.

It is expedient here if a respective width of one region of the aperture corresponds to a width of one section of the latching nose. This enables one section of the latching nose to be passed through one region of the aperture and the other section of the latching nose to be arranged in the other region of the aperture to form the plug-in/latching connection.

To produce the preloading forces, the spring element has two spring arms, wherein one of the spring arms applies a preloading force to the actuating element and the other spring arm applies a preloading force to the locking element.

In this arrangement, the spring element is preferably designed as a leaf spring, wherein the latching nose and the latching tab are arranged at one face side end of the spring element, and the spring arms are arranged at an opposite face side end of the spring element. By virtue of the fact that the spring arms produce preloading forces at one face side end of the spring element, the spring element is preloaded in such a way that the spring element remains reliably latched in the upper rail by means of the latching nose and the latching tab.

To fix the position of the actuating element, at least in the direction of a longitudinal axis, which extends parallel to a direction of travel in this case, the actuating element comprises at least one stop, wherein one of the spring arms is in operative engagement with the stop. In this arrangement, the spring arm is preferably in operative engagement with the stop, which applies a preloading force to the actuating element.

According to another embodiment of the invention, the actuating element is mounted pivotably in a through opening of the spring element. Here, the actuating element is in the form of a rocker, wherein end sections of the actuating element are moved in opposite directions when the actuating element is pivoted.

In this case, one actuating end of the actuating element is arranged between the locking element and the upper rail. During an actuation of the actuating element, e.g. an upward pivoting movement in the direction of a vertical axis, the actuating end is moved downwards in the direction of the vertical axis and hence in the direction of the lower rail. Since the actuating end is arranged between the locking element and the upper rail, the locking element is moved away from the upper rail and the longitudinal adjuster is unlocked.

One possibility for the embodiment of the locking element here is a guide peg which is arranged on the locking element and which serves as a guide element for the locking element and serves to stabilize a movement when the locking element is moved from a locking position into an unlocking position and back again.

A vehicle seat which comprises at least one longitudinal adjuster according to the invention is furthermore provided.

Here, the vehicle seat has an improved interface for fastening a spring element operatively connected to a locking element, as compared with the prior art.

Illustrative embodiments of the invention are explained in greater detail with reference to drawings. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
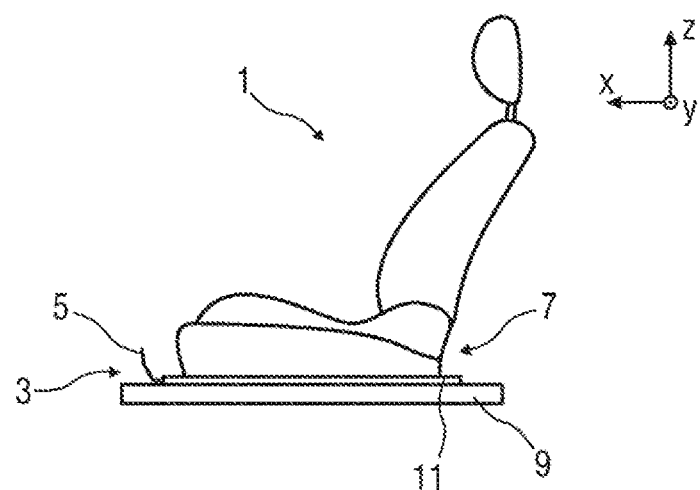
FIG. 1 is a schematic side view showing a vehicle seat having a longitudinal adjuster.

Referring to the drawings, parts that correspond to one another are provided with the same reference signs in all the figures.

FIG. 1 shows a vehicle seat 1 of a vehicle (not shown specifically) in side view.

Here, the arrangement of the vehicle seat 1 in the vehicle is defined by means of the coordinate system used below, comprising a vertical axis z associated with a vertical direction of the vehicle, a longitudinal axis x associated with a longitudinal direction of the vehicle, and a transverse axis y associated with a transverse direction of the vehicle.

The vehicle seat 1 has a longitudinal adjuster 3 according to the invention and an actuating element 5. When the actuating element 5 is actuated, the vehicle seat 1 can be moved relative to the vehicle along the longitudinal axis x.

For this purpose, the vehicle seat 1 has a rail pair 7 in the direction of the longitudinal axis x on each side of the vehicle seat, each pair having a lower rail 9 and an upper rail 11, which can be moved in relation to the lower rail 9 in the direction of the longitudinal axis x. Here, the lower rail 9 is firmly connected to the vehicle, wherein the upper rail 11 is connected to the vehicle seat 1.

The longitudinal adjuster 3 according to the invention is described in greater detail below. For this purpose, FIGS. 2 to 8 show the longitudinal adjuster 3 in various views.

Figure 2:
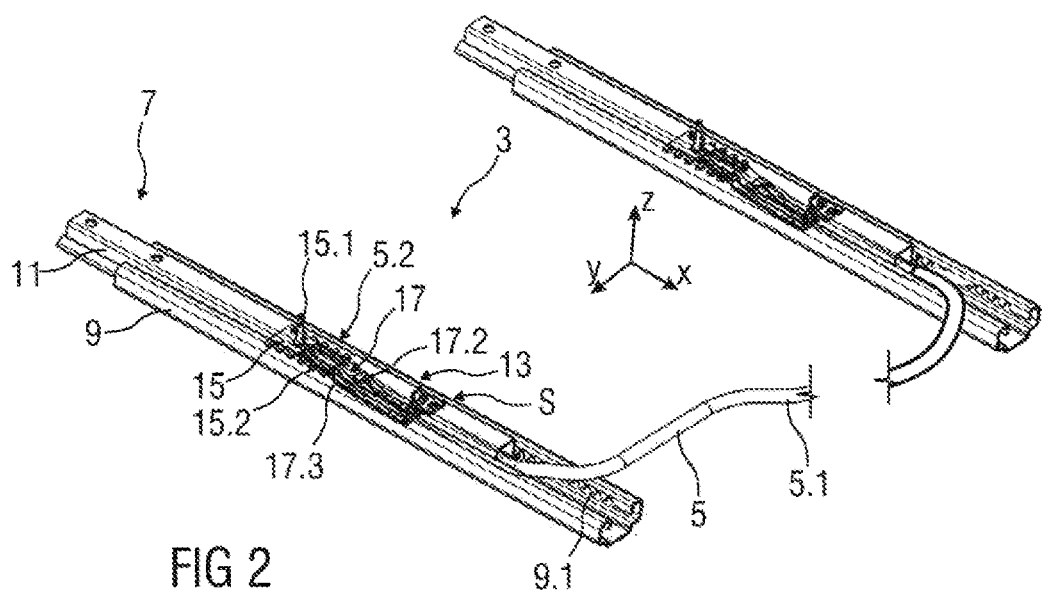
FIG. 2 is a schematic perspective, partially transparent view showing one illustrative embodiment of a longitudinal adjuster, comprising a rail pair and a locking unit.
Figure 3:
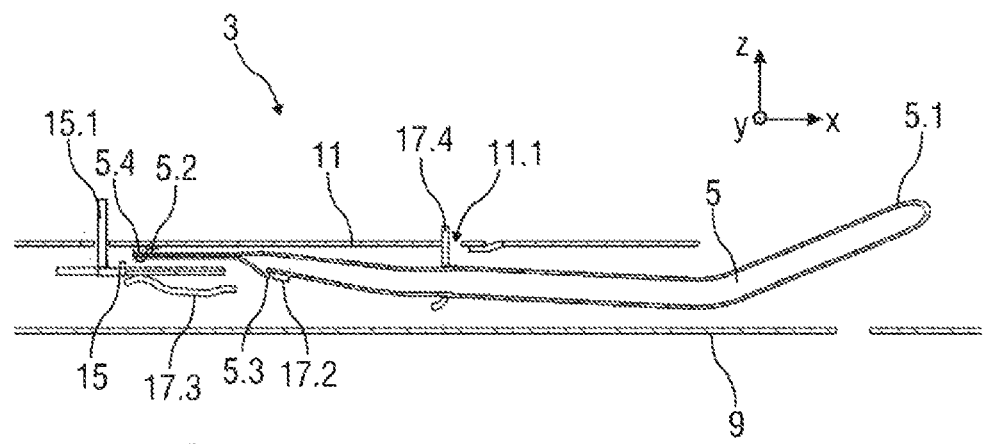
FIG. 3 is a schematic side view showing a section through the longitudinal adjuster in an unactuated state.
Figure 4:
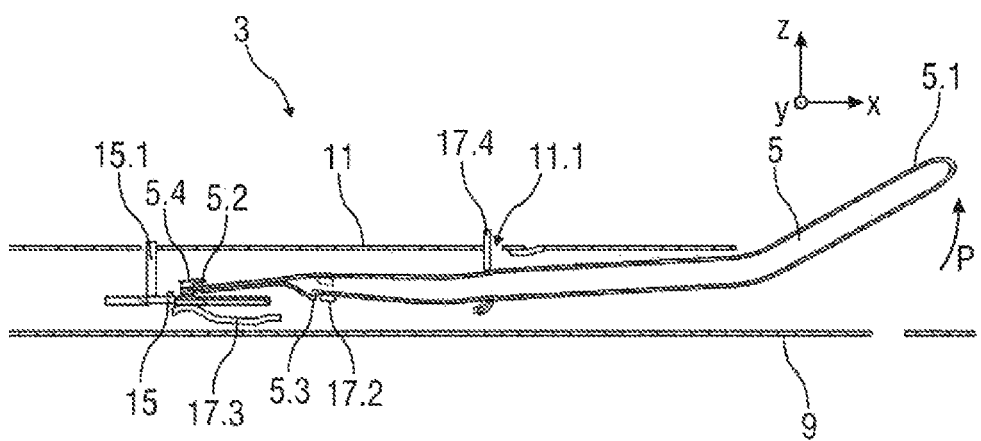
FIG. 4 is a schematic side view showing a section through the longitudinal adjuster in an actuated state.
Figure 5:
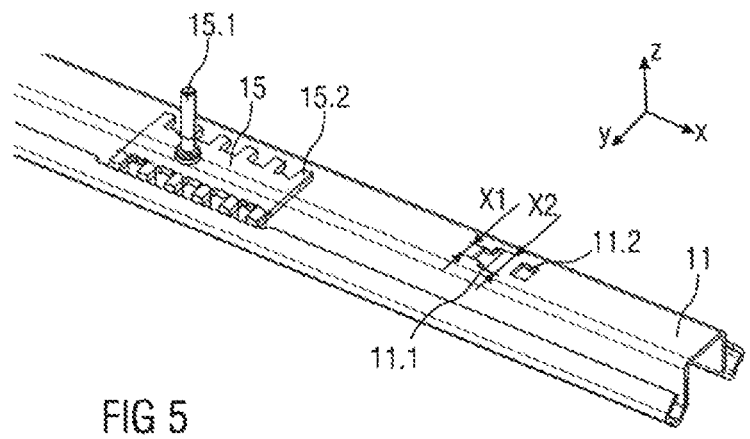
FIG. 5 is a perspective, partially transparent view showing an upper rail with an inner locking mechanism.
Figure 6:
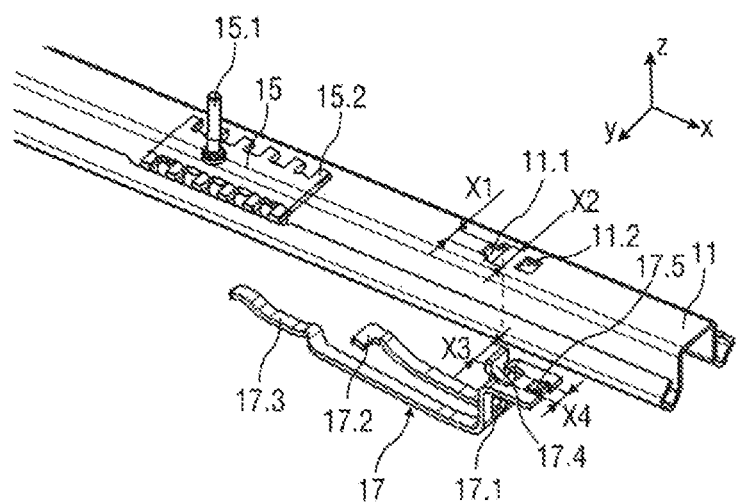
FIG. 6 is a schematic exploded view showing the upper rail and a spring element before assembly.
Figure 7:
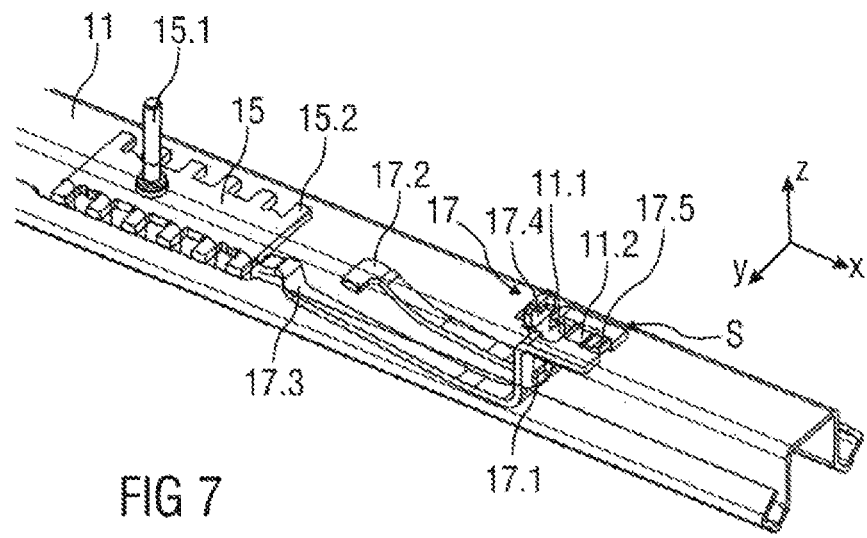
FIG. 7 is a schematic perspective, partially transparent view showing the upper rail during the assembly of the longitudinal adjuster, wherein the spring element has been inserted into an aperture of the upper rail.
Figure 8:
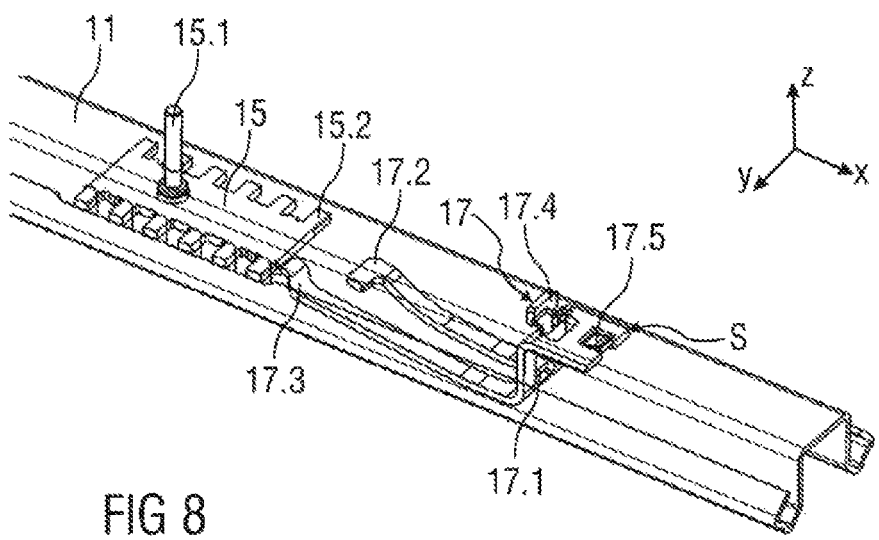
FIG. 8 is a schematic perspective, partially transparent view showing the upper rail after assembly, wherein the spring element is latched in an aperture of the upper rail.

In particular, FIG. 2 shows one illustrative embodiment of the longitudinal adjuster 3 in a perspective, partially transparent view, wherein the upper rail 11 is shown as being transparent in some areas. FIG. 3 shows a section through the longitudinal adjuster 3 in an unactuated state in side view. FIG. 4 shows a section through the longitudinal adjuster 3 in an actuated state schematically in side view. FIG. 5 shows the upper rail 11, in which the locking element 15 is arranged, in a perspective, partially transparent view. FIG. 6 shows the upper rail 11 illustrated in FIG. 5 before assembly in a perspective, partially transparent view. FIG. 7 shows the upper rail 11 during assembly in a perspective, partially transparent view, and FIG. 8 shows the upper rail 11 after assembly in a perspective, partially transparent view.

The longitudinal adjuster 3 comprises the rail pair 7 and a locking unit 13.

The locking unit 13 is designed to lock the upper rail 11 and comprises at least one spring element 17, a locking element 15 and the actuating element 5.

The actuating element 5 is formed as a handle or hoop (not shown specifically) on an actuating end 5.1. At an opposite unlocking end 5.2, the actuating element 5 is designed as an actuating tongue, which is arranged in the upper rail 11, in particular between the latter and the locking element 15.

The actuating element 5 is arranged in such a way on the spring element 17, in particular in a through opening 17.1 shown in FIGS. 6 to 8, that the actuating element 5 is supported as a rocker. When the actuating end 5.1 is actuated to unlock the longitudinal adjuster 3, the opposite, unlocking end 5.2 thus moves in an opposite direction.

The locking element 15 is in the form of a locking plate having lateral rib-shaped latching features 15.2 for locking the upper rail 11. Here, the locking element 15 is positioned between the upper rail 11 and the lower rail 9. The unlocking end 5.2 is arranged between the upper rail 11 and the locking element 15, as already described above. The locking element 15 furthermore comprises a guide peg 15.1, which projects upwards in the direction of the vertical axis z and which is passed through an opening in the upper rail 11 (not shown explicitly here).

According to the present illustrative embodiment, the spring element 17 is designed as a leaf spring and has two spring arms 17.2, 17.3, wherein one spring arm 17.2 exerts a substantially perpendicular spring force on the actuating element 5. In the present case, the spring force is produced along the vertical axis z in the direction of the vehicle seat 1. Preloading of the actuating element 5 produced by means of the spring force of spring arm 17.2 holds said element in a predetermined position, in which the locking element 15 is in a locking position. In the locking position, the lateral latching features 15.2 are in operative engagement with latching recesses 9.1 arranged in the lower rail 9, these being shown in part in FIG. 2.

Another spring arm 17.3 exerts a substantially perpendicular spring force on the locking element 15, wherein the spring force holds the locking element 15 in a predetermined position, in particular in the locking position of the locking element 15. In the present case, the spring force is produced along the vertical axis z in the direction of the vehicle seat 1.

During a process of unlocking the longitudinal adjuster 3, the actuating element 5, in particular the unlocking end 5.2, is actuated and moved upwards along the vertical axis z in the direction of the vehicle seat 1. Owing to this movement, in particular the movement of the unlocking end 5.2, and the design of the actuating element 5 as a rocker, the actuating element 5 counteracts the spring force produced by spring arm 17.2, wherein spring arm 17.2 is additionally stressed, allowing the actuating end 5.1 to be moved back into the original position when it is released.

The upward movement of the actuating end 5.1 along the vertical axis z in the direction of the vehicle seat 1 furthermore brings about a movement of the unlocking end 5.2 in the opposite direction, by means of which the spring force of spring arm 17.2 is counteracted and the locking element 15 is moved downwards in the direction of the vertical axis z.

As a result of this, the operative engagement between the latching features 15.2 and the latching recesses 9.1 is released, and a longitudinal movement of the upper rail 11 relative to the lower rail 9 is enabled.

In the unlocking position, spring arm 17.3 is additionally stressed, ensuring that the locking element 15 is moved back in the direction of the upper rail 11 when the actuating end 5.1 is released. Here, the locking position of the locking element 15 is reached when the latching features 15.2 latch with the latching recesses 9.1.

In the figure, the actuating end 5.1 of the actuating element 5, said end being designed as a handle for example, is positioned in such a way that the locking element 15 is in the locking position.

The spring element 17 has a latching nose 17.4, which is arranged in a corresponding aperture 11.1 in the upper rail 11 to form a plug-in connection. The spring element 17 furthermore has a latching tab 17.5, which is arranged in a corresponding further aperture 11.2 in the upper rail 11 to form a latching connection and to fix a position of the latching nose 17.4 in aperture 11.1. Together with the corresponding apertures 11.1, 11.2, the latching nose 17.4 and the latching tab 17.5 form a plug-in/latching connection S.

The actuating element 5 is passed through a through opening 17.1. Here, the actuating element 5 is supported in such a way in the through opening 17.1 (in a manner not shown specifically) that the actuating element 5 is designed as a rocker, as already mentioned above. In a region of the through opening 17.1, the actuating element 5 furthermore has lateral stops (not shown) in order to define and stabilize a position of the actuating element 5 in the spring element 17.

To fix the position of the actuating element 5, at least in the direction of the longitudinal axis x, said element has a further stop 5.3, on which spring arm 17.2 is arranged. By virtue of the spring force produced by means of spring arm 17.2, the arm is pressed against the actuating element 5 and a steady arrangement on the stop 5.3 is ensured.

The other spring arm 17.3 exerts the spring force on the locking element 15 along the vertical axis z in the direction of the vehicle seat 1, thereby holding said locking element in the position shown.

The unlocking end 5.2, which is designed as an actuating tongue, is arranged between an inner side of the upper rail 11, said inner side facing the lower rail 9, and the locking element 15. Locking element 15, on which the spring force produced by means of spring arm 17.3 is exerted, transmits this spring force to the unlocking end 5.2, thereby pressing said end against the upper rail 11. In order to minimize mechanical noises during an actuation of the actuating element 5, the unlocking end 5.2 comprises a damping element 5.4, e.g. a rubber plug or a plastic coating or a spring.

To actuate the actuating element 5 and thus unlock the longitudinal adjuster 3, the actuating end 5.1 is moved along the vertical axis z in the direction of the vehicle seat 1 in accordance with the arrow P shown in FIG. 4.

Owing to the movement of the actuating end 5.1 and the design of the actuating element 5 as a rocker, the actuating element 5, in particular the unlocking end 5.2, counteracts the spring forces produced by the spring arms 17.2, 17.3. The movement of the actuating end 5.1 along the vertical axis z in the direction of the vehicle seat 1 furthermore has the effect that the unlocking end 5.2 is moved in the opposite direction.

During this process, the locking element 15 is moved downwards along the vertical axis z and hence into the unlocking position by means of the unlocking end 5.2.

The connection between the spring element 17 and the upper rail 11 is explained in greater detail below.

The upper rail 11 has the aperture 11.1 in a flank extending in the direction of the longitudinal axis x. The aperture 11.1 is of substantially T-shaped design to allow the spring element 17 (not shown here) to be accommodated in a form-fitting and force-fitting manner. In this case, the aperture 11.1 has two regions with different widths X1, X2 in the direction of the transverse axis y, wherein the width X1 of a region facing the locking element 15 in the direction of the longitudinal axis x is smaller than the width X2 of the other region.

A further aperture 11.2 is arranged spaced apart from aperture 11.1 in the direction of the longitudinal axis x and is likewise provided for accommodating the spring element 17 in a form-fitting and force-fitting manner.

The spring element 17 has a latching tab 17.5 to enable it to be fixed in position on the upper rail 11. The latching tab 17.5 is produced by means of stamping and subsequent forming, for example, or, as an alternative, is designed as a latching pin projecting from the spring element 17 or as a separate latching pin arranged on, e.g. welded on, the spring element 17. Here, the latching tab 17.5 has a width corresponding to the further aperture 11.2 in the direction of the transverse axis y.

In the present case, the spring element 17 is of integral design, wherein the latching nose 17.4 has been shaped by means of stamping and subsequent forming, for example. In an illustrative embodiment which is not shown, the latching nose 17.4 is arranged, e.g. screwed on, by means of a force-fitting and/or form-fitting connection.

The latching nose 17.4 extends vertically along the vertical axis z and is of substantially T-shaped design. Here, a wide section of the latching nose 17.4, which is towards the top along the vertical axis z, has a width X3, and a lower, narrow section has a width X4. In this arrangement, the width X2 of the aperture 11.1 corresponds to the width X3 of the latching nose 17.4, and the width X1 of the aperture 11.1 corresponds to the width X4 of the latching nose 17.4.

The spring arms 17.2, 17.3 extend along the longitudinal axis x and are formed so as to be spaced apart in such a way that they can apply separate spring forces.

Spring arm 17.2 is angled in such a way along the transverse axis y at an opposite end from latching nose 17.4 that it is possible to produce engagement of spring arm 17.2 with the stop 5.3 of the actuating element 5.

Spring arm 17.3 is of arched design at an end opposite the latching nose 17.4, in such a way that an additional spring force action on the locking element 15 is achieved.

FIG. 7 shows an assembly step in which the spring element 17, in particular the latching nose 17.4, is introduced into the aperture 11.1 of the upper rail 11. During this process, the upper region with the width X3 of the latching nose 17.4 is passed through the wide region X2 of aperture 11.1.

FIG. 8 shows the longitudinal adjuster 3 after assembly, wherein the spring element 17 has been moved longitudinally out of a position shown in FIG. 7 in the direction of the locking element 15. During this process, the latching nose 17.4 is latched into the aperture 11.1 of the upper rail 11. The narrow region of the latching nose 17.4 is guided into the narrow region of aperture 11.1, and the latching tab 17.5 is latched in the further aperture 11.2. By means of the arrangement of the latching tab 17.5 in the further aperture 11.2, the latching nose 17.4 is fixed in its position.

The described arrangement of the spring element 17 on the upper rail 11 is a plug-in/latching connection S. The preloading forces of the spring element 17 on the locking element 15 and on the actuating element 5 hold the spring element 17 in the upper rail 11.

Forces acting externally on the actuating element 5 along the vertical axis z do not produce any moments on the spring element 17 by means of latching of the spring element 17 in the apertures 11.1, 11.2, which are situated in one plane. Tension and compression forces along the longitudinal axis x can be absorbed by the spring element 17.

While specific embodiments of the invention have been shown and described in detail to illustrate the application of the principles of the invention, it will be understood that the invention may be embodied otherwise without departing from such principles.

What is claimed is:

1. A longitudinal adjuster for a vehicle seat, the longitudinal adjuster comprising:
    at least one rail pair, comprising a lower rail and an upper rail, which the upper rail can be moved longitudinally relative to the lower rail;
    at least one locking unit for locking the upper rail;
    at least one actuating element for releasing the at least one locking unit of the upper rail; and
    at least one spring element comprising a first spring end and a second spring end;
    wherein:
    the at least one locking unit comprises at least one locking element, the at least one locking element and the first spring end of the at least one spring element are in operative engagement with one another, the first spring end touching a flat surface of the at least one locking element;
    the at least one actuating element and the second spring end of the at least one spring element are in operative engagement with one another;
    the at least one spring element is force-fitting connected to the upper rail by a plug-in and latching connection;
    the at least one spring element comprising at least one latching nose and at least one latching tab;
    the at least one latching nose and the at least one latching tab being arranged in corresponding apertures in the upper rail to form the plug-in and latching connection; and
    the at least one spring element having a first spring arm and a second spring arm, the first spring arm applies a preloading force to the at least one locking element and the second spring arm applies a preloading force to the at least one actuating element, wherein the at least one spring element is designed as a leaf spring, and the at least one latching nose and the at least one latching tab are arranged at one face side end of the at least one spring element, and the spring arms are arranged at an opposite face side end of the at least one spring element.

2. The longitudinal adjuster according to claim 1, wherein the at least one latching nose can be inserted into one of the corresponding apertures, and the at least one latching tab can be latched in a different one of the corresponding apertures.

3. The longitudinal adjuster according to claim 2, wherein:
    the one of the corresponding apertures having the at least one latching nose inserted therein has two regions with widths that differ in a direction of a transverse axis; and
    the at least one latching nose has two sections with widths that differ in the direction of the transverse axis.

4. The longitudinal adjuster according to claim 3, wherein a respective width of one region of the one of the corresponding apertures having the at least one latching nose inserted therein corresponds to a width of one section of the at least one latching nose.

5. The longitudinal adjuster according to claim 1, wherein one of the spring arms is in operative engagement with a stop of the at least one actuating element.

6. The longitudinal adjuster according to claim 1, wherein the at least one actuating element is mounted pivotably in a through opening of the at least one spring element.

7. The longitudinal adjuster according to claim 1, wherein an actuating end of the at least one actuating element is arranged between the at least one locking element and the upper rail.

8. The longitudinal adjuster according to claim 1, wherein the at least one locking element is arranged between the upper rail and the lower rail and has a guide peg.

9. A vehicle seat comprising at least one longitudinal adjuster comprising:
    at least one rail pair, comprising a lower rail and an upper rail, which the upper rail can be moved longitudinally relative to the lower rail;
    at least one locking unit for locking the upper rail;
    at least one actuating element for releasing the at least one locking unit of the upper rail; and
    at least one spring element comprising a first spring end and a second spring end;
    wherein:
    the at least one locking unit comprises at least one locking element, the at least one locking element and the first end of the at least one spring element are in operative engagement with one another;
    the at least one actuating element and the second spring end of the at least one spring element are in operative engagement with one another;
    the at least one spring element comprising at least one latching nose and at least one latching tab;
    the at least one spring element is force-fitting connected to the upper rail in a form and force-fitting manner by a plug-in and latching connection, wherein the at least one latching nose and the at least one latching tab are arranged in corresponding apertures in the upper rail to form the plug-in and latching connection;
    the at least one spring element having two spring arms, one of the spring arms applies a preloading force to the at least one actuating element and another one of the spring arms applies a preloading force to the at least one locking element, wherein one of the spring arms is in operative engagement with a stop of the at least one actuating element;
    the at least one spring element is designed as a leaf spring; and
    the at least one latching nose and the at least one latching tab are arranged at one face side end of the at least one spring element, and the spring arms are arranged at an opposite face side end of the at least one spring element.

10. The vehicle seat according to claim 9, wherein the at least one latching nose can be inserted into a first aperture of the corresponding apertures in the upper rail, and the at least one latching tab can be latched in a second aperture of the corresponding apertures in the upper rail.

11. The vehicle seat according to claim 10, wherein:
the first aperture corresponding to the at least one latching nose has two regions with widths that differ in a direction of a transverse axis; and
the at least one latching nose has two sections with widths that differ in the direction of the transverse axis.

12. The vehicle seat according to claim 11, wherein a respective width of one region of the first aperture corresponds to a width of one section of the at least one latching nose.

13. The vehicle seat according to claim 9, wherein:
the at least one actuating element is mounted pivotably in a through opening of the at least one spring element;
an actuating end of the at least one actuating element is arranged between the at least one locking element and the upper rail; and
the at least one locking element is arranged between the upper rail and the lower rail and has a guide peg.

14. The longitudinal adjuster according to claim 1, wherein:
the spring arms of the at least one spring element have different lengths;
the first spring end is at an end of the first spring arm and the second spring end is at an end of the second spring arm.

15. The longitudinal adjuster according to claim 14, wherein:
the first spring end engages the at least one locking element;
the first spring arm is longer than the second spring arm;
the second spring end engages the at least one actuating element.

16. The longitudinal adjuster according to claim 1, wherein:
the first spring end bears against a lower side of the at least one locking element.

17. The longitudinal adjuster according to claim 1, wherein:
the second spring end bears against a stop of the at least one actuating element.

18. The longitudinal adjuster according to claim 1, wherein:
the at least one latching nose is inserted into a first aperture of the corresponding apertures in the upper rail and fixed in a plug-in connection to the upper rail; and
wherein the at least one latching tab is inserted into a second aperture of the corresponding apertures in the upper rail and fixed in a latching connection to the upper rail.

19. The longitudinal adjuster according to claim 18, wherein:
the first aperture corresponding to the at least one latching nose has two regions with widths that differ in the direction of a transverse axis, and the at least one latching nose has two sections with widths that differ in the direction of the transverse axis.

20. The longitudinal adjuster according to claim 18, wherein:
a respective width of one region of the first aperture corresponds to a width of one section of the at least one latching nose.

21. The longitudinal adjuster according to claim 18, wherein:
the first aperture and the second aperture are situated in one plane.

22. The longitudinal adjuster according to claim 18, wherein:
the first aperture is spaced apart from the second aperture in a longitudinal direction.

23. A longitudinal adjuster for a vehicle seat, the longitudinal adjuster comprising:
at least one rail pair, comprising a lower rail and an upper rail, which upper rail can be moved longitudinally relative to the lower rail;
at least one locking unit for locking the upper rail;
at least one actuating element for releasing the at least one locking unit of the upper rail; and
at least one spring element comprising a first spring end and a second spring end;
wherein:
the at least one locking unit comprises at least one locking element, the at least one locking element and the first spring end of the at least one spring element are in operative engagement with one another, the first spring end touching a flat surface of the at least one locking element;
the at least one actuating element and the second spring end of the at least one spring element are in operative engagement with one another,
the at least one spring element is force-fitting connected to the upper rail by a plug-in and latching connection,
the at least one spring element applies a preloading force to the at least one actuating element and to the at least one locking element, the at least one spring element has at least one latching nose and at least one latching tab, which can be arranged in corresponding apertures in the upper rail to form the plug-in and latching connection,
wherein the at least one latching nose can be inserted into a first aperture, and the at least one latching tab can be latched in a second aperture,
wherein the first aperture corresponding to the at least one latching nose has two regions with widths that differ in the direction of a transverse axis, and the at least one latching nose has two sections with widths that differ in the direction of the transverse axis.

* * * * *